(12) United States Patent
Joye et al.

(10) Patent No.: US 8,955,277 B1
(45) Date of Patent: Feb. 17, 2015

(54) DEVICE FOR RAISING DRYWALL OFF OF A FLOORING SURFACE AND METHOD OF USE

(71) Applicants: David Allen Joye, Charlotte, NC (US); David James Atkins, Matthews, NC (US)

(72) Inventors: David Allen Joye, Charlotte, NC (US); David James Atkins, Matthews, NC (US)

( * ) Notice: Subject to any disclaimer, the term of this patent is extended or adjusted under 35 U.S.C. 154(b) by 22 days.

(21) Appl. No.: 14/089,847

(22) Filed: Nov. 26, 2013

(51) Int. Cl.
*E04B 1/70* (2006.01)
*E04B 1/64* (2006.01)
*E04F 19/00* (2006.01)
*F16M 11/00* (2006.01)

(52) U.S. Cl.
CPC . *E04B 1/64* (2013.01); *E04F 19/00* (2013.01); *F16M 11/00* (2013.01)
USPC ............ 52/302.1; 52/99; 52/290; 52/288.1; 52/241; 52/479

(58) Field of Classification Search
USPC .......... 52/302.1, 290, 288.1, 287.1, 241, 242, 52/479, 481.2, 98, 99; 414/10, 11, 12; 269/303, 306
See application file for complete search history.

(56) References Cited

U.S. PATENT DOCUMENTS

| | | | | | |
|---|---|---|---|---|---|
| 1,673,971 | A | * | 6/1928 | Dowell | 52/241 |
| 1,701,714 | A | * | 2/1929 | Ballenger | 52/288.1 |
| 2,887,870 | A | * | 5/1959 | Slowinski | 52/242 |
| 3,228,160 | A | * | 1/1966 | O'Brien | 52/242 |
| 3,393,484 | A | * | 7/1968 | Dunnington | 52/287.1 |
| 3,397,495 | A | * | 8/1968 | Thompson et al. | 52/241 |
| 3,872,633 | A | * | 3/1975 | Altosaar et al. | 52/127.5 |
| 5,020,290 | A | * | 6/1991 | Hajjar | 52/242 |
| 5,658,113 | A | * | 8/1997 | Lazo | 414/11 |
| 6,785,977 | B1 | * | 9/2004 | Crichton | 33/613 |
| 2005/0257492 | A1 | * | 11/2005 | Miller | 52/749.1 |

* cited by examiner

*Primary Examiner* — Robert Canfield
*Assistant Examiner* — Matthew Gitlin
(74) *Attorney, Agent, or Firm* — Ted Masters

(57) ABSTRACT

A device raises drywall off of a flooring surface. The device cooperates with a track which is connected to the flooring surface, the track having a side wall. The device includes a rod to which are connected a plurality of spaced apart clips. The clips are shaped and dimensioned to connect to the side wall of the track so that the rod resides outside the track and rests upon the flooring surface. The drywall is then placed upon the rod and thereby is spaced apart from the flooring surface.

13 Claims, 8 Drawing Sheets

DEVICE FOR RAISING DRYWALL OFF OF A FLOORING SURFACE AND METHOD OF USE

CROSS REFERENCE TO RELATED APPLICATION

None

TECHNICAL FIELD

The present invention pertains generally to wall construction, and more particularly to a device for holding drywall off of a flooring surface so that it will not absorb moisture.

BACKGROUND OF THE INVENTION

Drywall, which is also known as plasterboard, wallboard, gypsum board, and sheet rock, comprises a panel having a layer of plaster which is sandwiched between two sheets of heavy paper. In the construction industry, the drywall is connected to upright studs to form walls. If the drywall rests directly upon a flooring surface, moisture from the surface can "wick" up into the drywall and result in damage and mold. For example, flooding or even mopping can result in unwanted wicking. As such, construction specifications usually call for a gap (e.g. ⅝ inches) between the bottom edge of the drywall and the flooring surface. Maintaining such a uniform gap can be time consuming during installation, and on occasion the drywall can even become detached from the studs and fall. Often times, to save money and time, the gap is not provided. This often goes unnoticed to the customer because the gap, itself, is covered with a baseboard. If the gap is not provided, or even if the gap is filled with caulking material, wicking and mold can occur.

BRIEF SUMMARY OF THE INVENTION

The present invention is directed to a device for preventing moisture from entering drywall. The device serves as a spacer which holds the drywall above the flooring surface so that moisture cannot seep into the drywall. The device reduces or completely eliminates the spread of mold, and reduces drywall installation time thereby saving money. The device includes an elongated rod or strip to which are attached a plurality of clips. The clips are shaped and dimensioned to connect to the side wall of a track. In embodiments of the invention the rod is made of fiberglass or other moisture and fire resistant material, and the clips can be broken off so as not to interfere with an obstacle such as a stud. Once the device is connected to the track, the drywall is rested upon the rod and thereby raised off of the flooring surface. After installation of the drywall, if deemed necessary (due to uneven floors, for example), a very thin strip of caulk can be applied along the bottom of the device.

In accordance with an embodiment, a device raises drywall off of a flooring surface. The device cooperates with a track which is connected to the flooring surface, the track having a side wall. The device includes a rod. A plurality of spaced apart clips are connected to the rod, the clips being shaped and dimensioned to connect to the side wall of the track.

In accordance with another embodiment, the side wall of the track has an inside surface. Each clip includes an arm which is shaped and dimensioned to abut the inside surface of the side wall of the track. The arm is removably connected to the rod so that the arm can be selectively disconnected therefrom.

In accordance with another embodiment, each clip includes an anchor which is embedded in the rod, the anchor includes a frangible joint.

In accordance with another embodiment, a distance between adjacent clips is about 16 inches.

In accordance with another embodiment, the rod has a rectangular cross section.

In accordance with another embodiment, the side wall of the track has a height. The rod has a height which is about one half of the height of the side wall.

In accordance with another embodiment, the drywall has a thickness. The rod has a width which is approximately equal to the thickness of the drywall.

In accordance with another embodiment, the drywall has a bottom edge. When the device is connected to the side wall of the track, the rod resides outside the track and rests upon the flooring surface. The rod is shaped and dimensioned such that the bottom edge of the drywall can rest thereon.

Other embodiments, in addition to the embodiments enumerated above, will become apparent from the following detailed description, taken in conjunction with the accompanying drawings, which illustrate, by way of example, the principles of the device and method of use.

BRIEF DESCRIPTION OF THE DRAWINGS

FIG. 26 is an enlarged cross sectional view showing the clip disconnected from the rod; and, FIG. 27 is an enlarged cross sectional view of a second embodiment clip.

DETAILED DESCRIPTION OF THE INVENTION

Figures 1, 2:
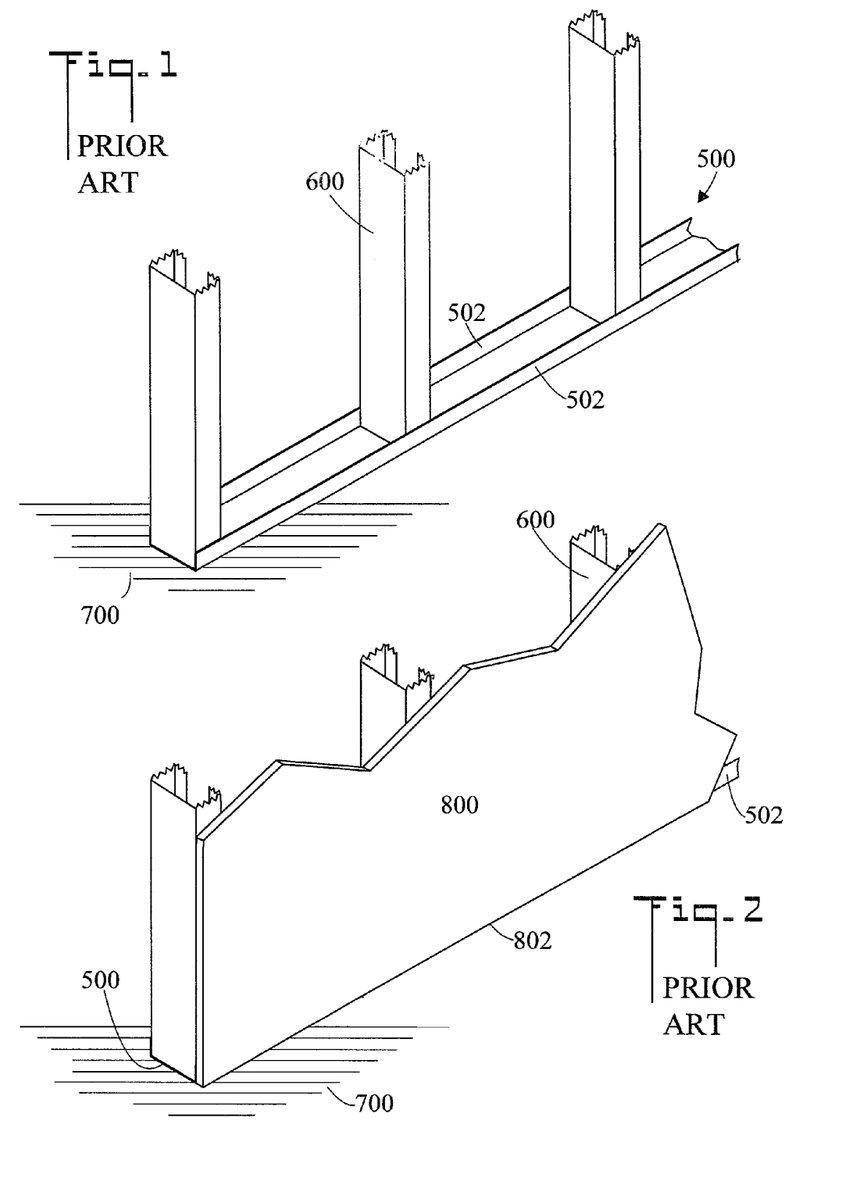
FIG. 1 is a fragmented perspective view of a prior art track and studs.
FIG. 2 is a fragmented perspective view of the prior art track and studs with drywall attached.

Referring initially to FIG. 1, there is illustrated a fragmented perspective view of a prior art track 500 (also known as a stud track) which receives and serves as a foundation for upstanding studs 600. Such tracks 500 and studs 600 are typically fabricated from metal. Track 500 is channel-shaped and has two upstanding walls 502. Track 500 is connected to a flooring surface 700 such as one of concrete or wood.

Figures 3, 4:
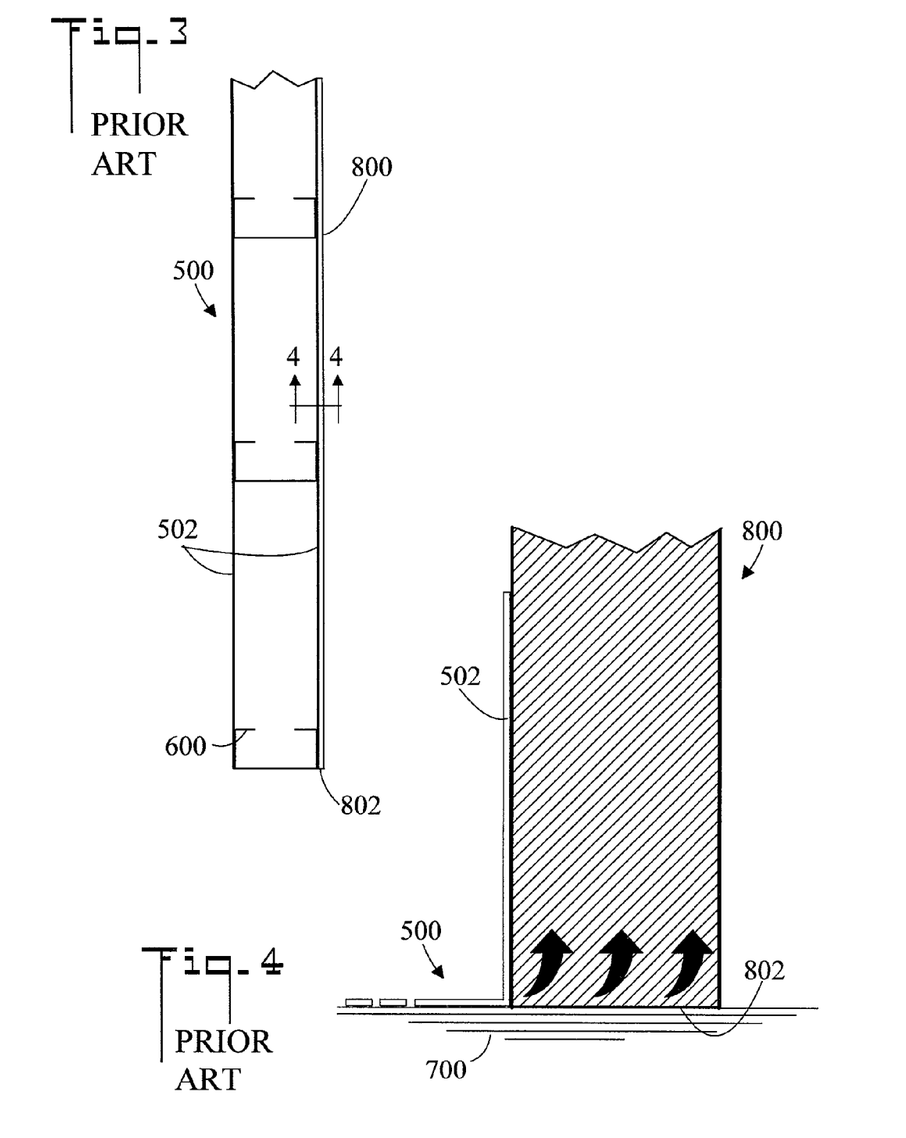
FIG. 3 is a fragmented top plan view of the prior art track, studs and drywall.
FIG. 4 is an enlarged fragmented cross sectional view along the line 4-4 of FIG. 3.

FIGS. 2 and 3 are fragmented perspective and top plan views respectively of the prior art track 500 and studs 600 with drywall 800 attached. Drywall 800 is connected to studs 600 in the conventional manner. As shown, the bottom edge 802 of drywall 800 rests upon flooring surface 700, and is therefore susceptible to wicking and moisture damage. FIG. 4 is an enlarged fragmented cross sectional view along the line 4-4 of FIG. 3. Since bottom edge 802 of drywall 800 rests directly on flooring surface 700, moisture (indicated by the arrows) can enter drywall 800 by wicking and cause damage.

Figures 5, 6, 7, 8:
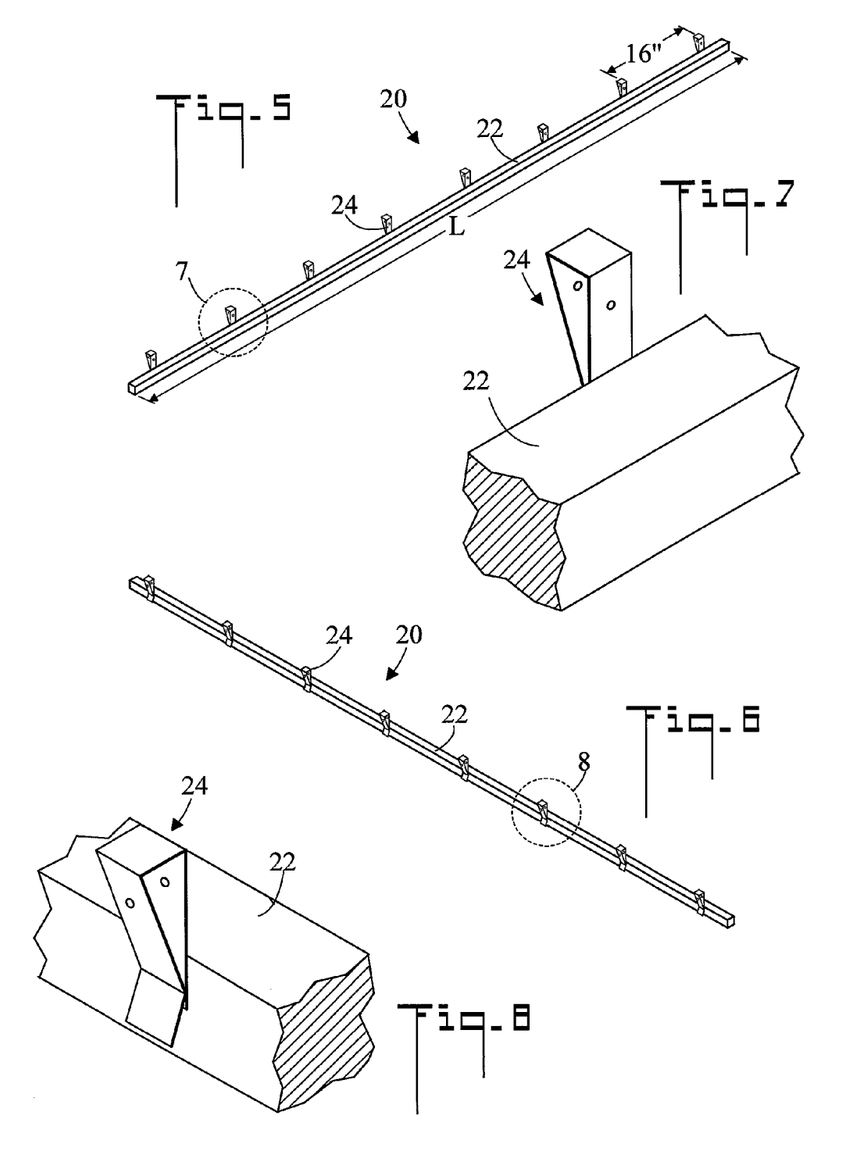
FIG. 5 is a perspective view of a device for raising drywall off of a flooring surface.
FIG. 6 is a reverse perspective view of the device.
FIG. 7 is an enlarged fragmented view of area 7 of FIG. 5.
FIG. 8 is an enlarged fragmented view of area 8 of FIG. 6.

FIGS. 5 and 6 are perspective and reverse perspective views respectively of a device for raising drywall off of flooring surface 700, the device generally designated as 20. Device 20 cooperates with track 500 which has a side wall 502 (two side walls as shown), track 500 being connected to flooring surface 700. Device 20 includes an elongated rod 22. In an embodiment rod 22 is about 10 feet long. A plurality of spaced apart clips 24 are connected to rod 22. In an embodiment, a distance between adjacent clips 24 is about 16 inches, which is equal to the nominal spacing of studs 600 (refer to FIG. 1). This spacing will result in the shown configuration wherein eight clips 24 are connected to rod 22, with the end clips 24 residing about four inches from the ends of rod 22. However, it may be appreciated that other clip 24 spacings can also be used. Clips 24 are shaped and dimensioned to connect to side wall 502 of the track 500 so that rod 22 resides outside track 500 and rests upon flooring surface 700 (also refer to FIG. 9 and the associated discussion). Also in an embodiment, rod 22 is fabricated from fiberglass or other moisture resistant, fire resistant, semi-flexible material.

FIG. 7 is an enlarged fragmented view of area 7 of FIG. 5, and FIG. 8 is an enlarged fragmented view of area 8 of FIG. 6. Shown are rod 22 and connected clip 24.

Figures 9, 10, 11:
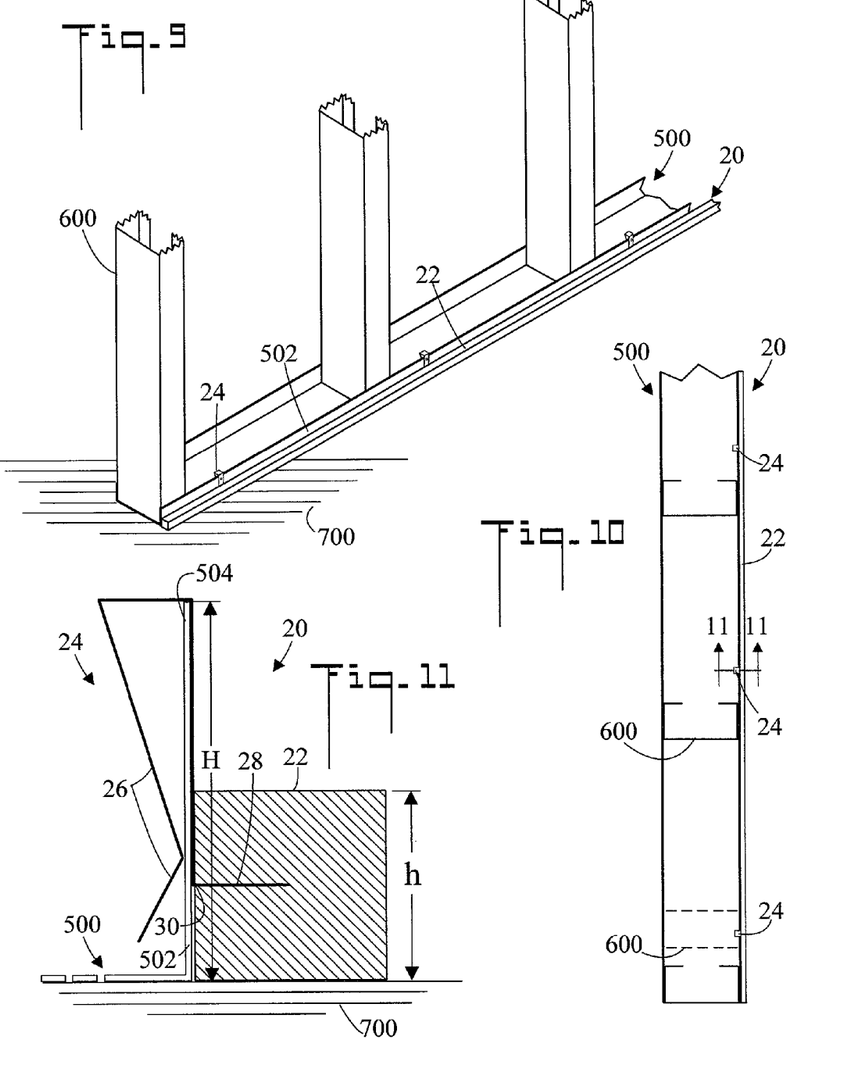
FIG. 9 is a fragmented perspective view of the device connected to the side wall of the track.
FIG. 10 is a fragmented top plan view of the device connected to the side wall of the track.
FIG. 11 is an enlarged cross sectional view along the line 11-11 of FIG. 10.

FIGS. 9 and 10 are fragmented perspective and top plan views respectively of device 20 connected to the side wall 502 of track 500. Clips 24 have been used to connect device 20 to side wall 502 of track so that rod 22 resides outside track 500 and rests upon flooring surface 700. In this position, device 20 is ready to support drywall 800 as is shown in FIGS. 12-14.

FIG. 11 is an enlarged cross sectional view along the line 11-11 of FIG. 10. Clip 24 connects device 20 to side wall 502 of track 500 so that rod 22 resides outside track 500 and rests upon support surface 700. In the shown embodiment, rod 22 has a rectangular cross section (square as shown), however other shapes are also possible. In another embodiment, side wall 502 of track 500 has a height H (typically about 1.25 inches). Rod 22 has a height h (about ⅝ inches) which is about one half of the height H of the side wall 502. However, it may be appreciated that the height h of rod 22 can be made greater, to hold drywall 800 a greater distance from flooring surface 700 (refer to FIG. 12). This greater distance would be useful in flooring areas where moisture is expected.

Side wall 502 of track 500 has an inside surface 504. Clip 24 includes an arm 26 which is shaped and dimensioned to abut inside surface 504 of side wall 502 of track 500. This is the holding mechanism by which device 20 is connected to track 500. Arm 26 is removably connected to rod 22 so that arm 26 can be selectively disconnected therefrom. Disconnecting arm 26 from rod 22 is effected by clip 22 including an anchor 28 which is fixedly embedded in rod 22, and anchor 28 including a frangible joint 30 (refer also to FIGS. 25 and 26 and the associated discussions). Disconnecting a clip 24 can be necessary if a clip 24 happens to be positioned so that it interferes with a stud 600 or other obstacle. For example, in FIG. 10, were a stud 600 to exist as shown by the dashed lines, device 20 could not be properly connected to track 500 unless the clip 24 which interfered with the stud 600 were removed (the lower clip 24 in the drawing needs to be removed prior to connecting device 20 to the side wall 502 of track 500).

Figures 12, 13, 14:
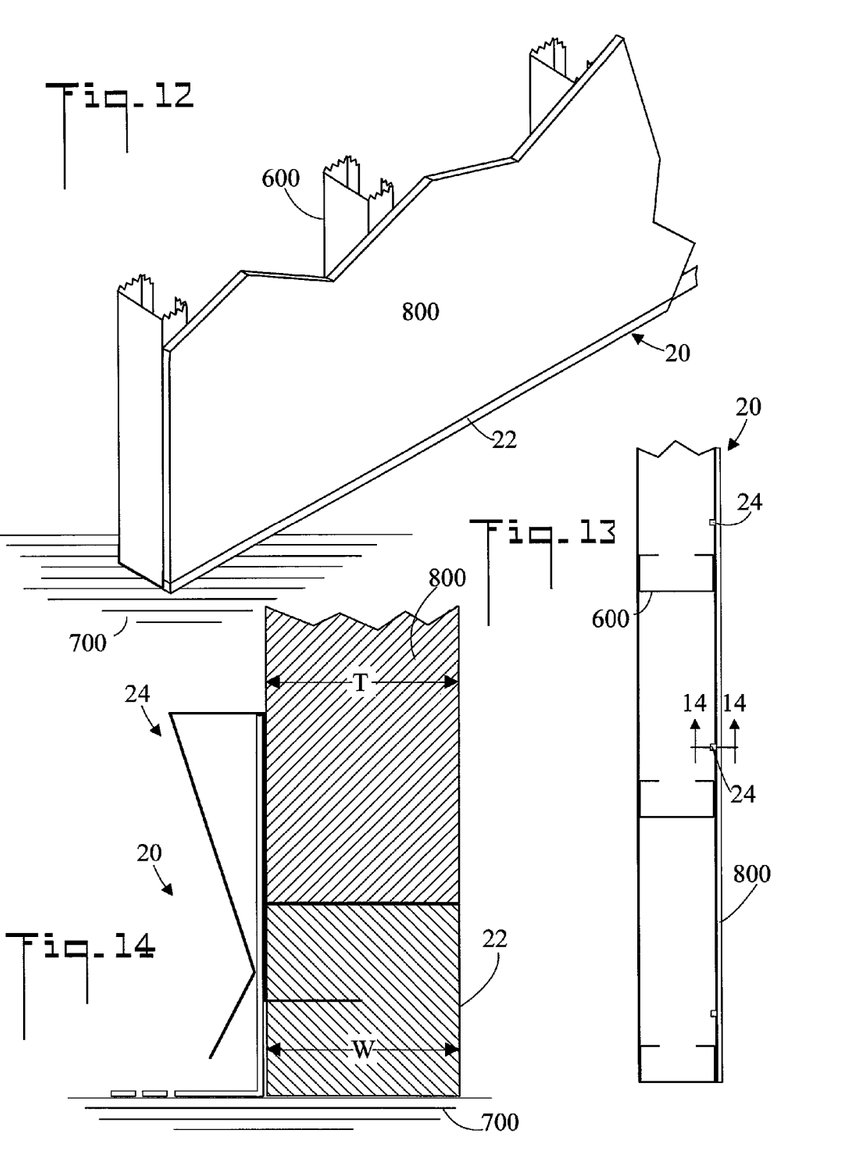
FIG. 12 is a fragmented perspective view of the device raising drywall off of the flooring surface.
FIG. 13 is a fragmented top plan view of the device raising drywall off of the flooring surface.
FIG. 14 is an enlarged cross sectional view along the line 14-14 of FIG. 13.
Figure 15:
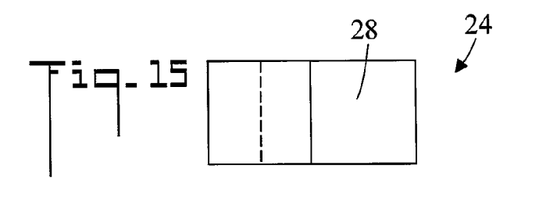
FIG. 15 is an enlarged top plan view of a clip.
Figures 16, 17, 18, 19, 20:
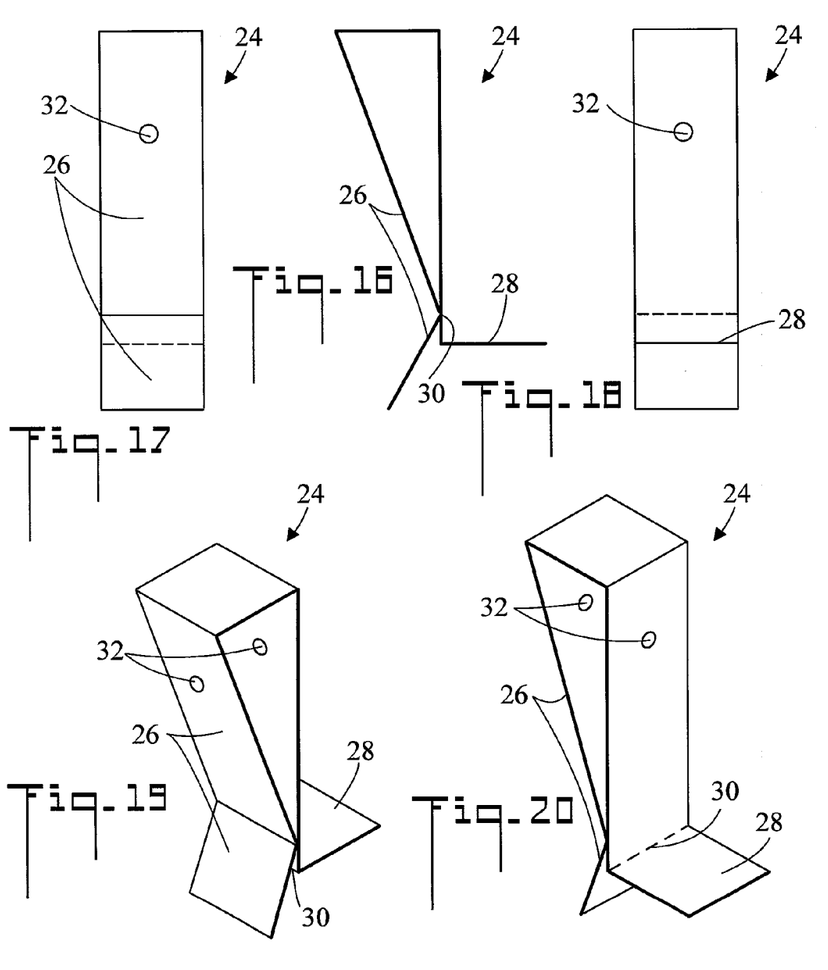
FIG. 16 is an enlarged side elevation view of the clip.
FIG. 17 is an enlarged front elevation view of the clip.
FIG. 18 is an enlarged rear elevation view of the clip.
FIG. 19 is an enlarged perspective view of the clip.
FIG. 20 is an enlarged reverse perspective view of the clip.

FIGS. 12 and 13 are fragmented perspective and top plan views respectively of device 20 raising drywall 800 off of flooring surface 700, and FIG. 14 is an enlarged cross sectional view along the line 14-14 of FIG. 13. Drywall 800 has been rested (placed) upon rod 22 of device 20, and therefore moisture damage to drywall 800 is reduced or eliminated. In the shown embodiment, drywall 800 has a thickness T (typically about ⅝ inches). Rod 22 has a width W which is approximately equal to the thickness T of the drywall 800, so that rod 22 is flush with the installed drywall 800.

FIG. 15-20 are enlarged top plan, enlarged side elevation, enlarged front elevation, enlarged rear elevation, enlarged perspective, and enlarged reverse perspective views respectively of clip 24. Shown are arm 26, anchor 28, and frangible joint 30 (best seen in FIG. 20). Frangible joint 30 is purposely weakened (such as by scoring or perforating) so that it can be ruptured by repeated bending back and forth. Clip 24 also includes screw holes 32 for selectively connecting device 20 to side wall 502 of track 500 (refer to FIG. 23 and the associated discussion). It is noted that clip 24 is fabricated from a resilient material which biases arm 26 into a closed position so that it will closely abut side wall 502 (refer to FIG. 11).

Figures 21, 22, 23, 24:
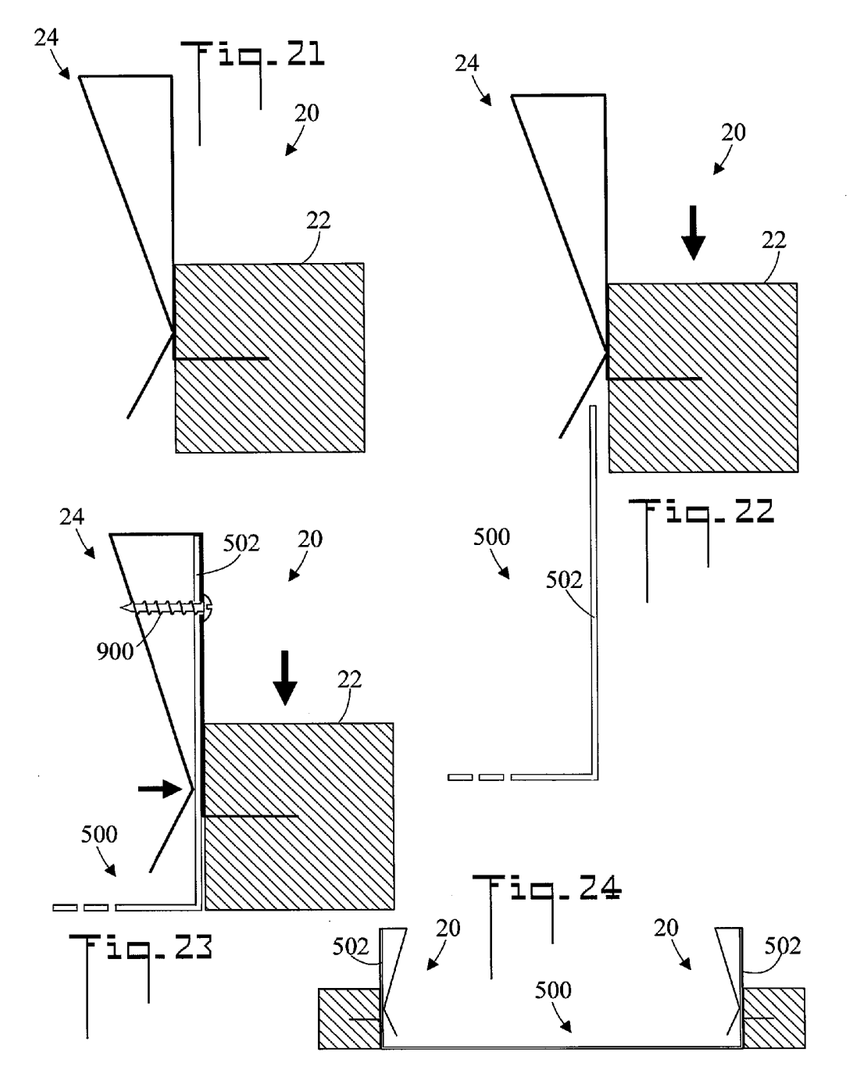
FIG. 21 is an enlarged cross sectional view showing the device.
FIG. 22 is an enlarged cross sectional view showing the device being connected to the side wall of the track.
FIG. 23 is an enlarged cross sectional view showing the device connected to the side wall of the track.
FIG. 24 is an enlarged cross sectional view showing one device connected to each side wall of the track.

FIGS. 21-23 show the sequence of connecting device 20 to side wall 502 of track 500. FIG. 21 shows a cross sectional view (as in FIG. 11) of device 20. In FIG. 22 device 20 is positioned above side wall 502 and moved down so that clip 24 engages side wall 502. In FIG. 23 clip 24 has been moved down so that clip 24 fully engages side wall 502. In the shown embodiment, a screw 900 which cooperates with screw holes 32 (refer to FIG. 17) is used to fixedly connect device 20 to side wall 502.

FIG. 24 is an enlarged cross sectional view showing one device 20 connected to each side wall 502 of track 500.

Figure 25:
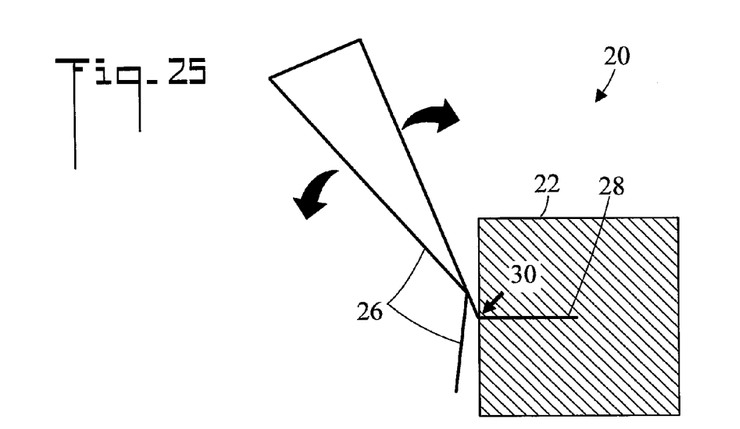
FIG. 25 is an enlarged cross sectional view showing the clip being disconnected from the rod.
Figures 26, 27:
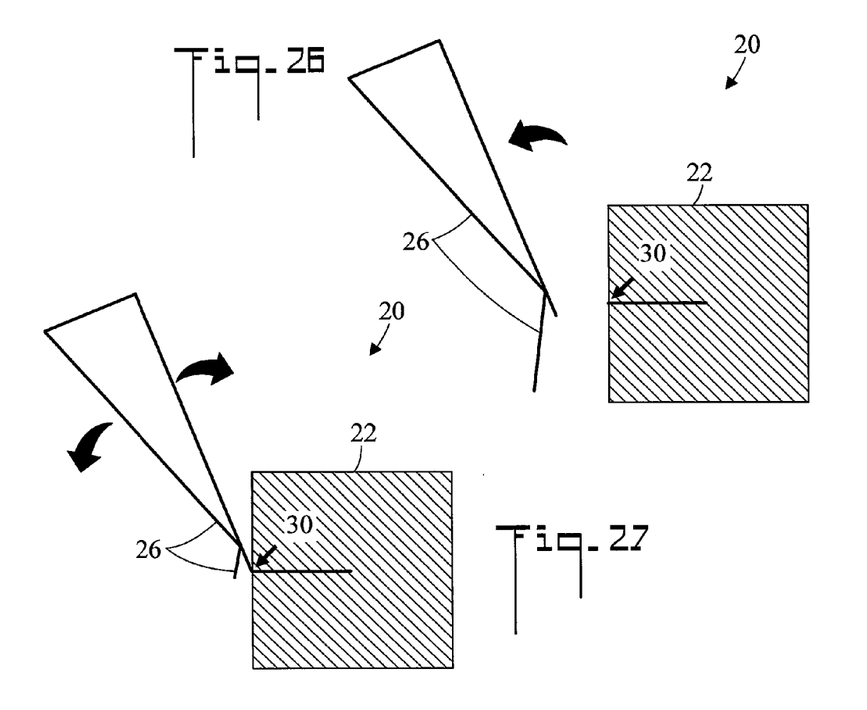

FIG. 25 is an enlarged cross sectional view showing clip 24 being disconnected (broken away) from rod 22. Arm 26 is repeatedly bent back and forth about frangible joint 30 until the joint ruptures, and arm 26 is disconnected from rod 22 as shown in FIG. 26. It is noted that arm 26 is disconnected from rod 22 before device 20 is connected to side wall 502 of track 500.

FIG. 27 is an enlarged cross sectional view of a second embodiment clip 24. In this embodiment arm 26 has been both shortened and angularly bent so that a larger arc of back and forth bending is possible.

It may be appreciated that device 20 may be combined with certain of the prior art elements described above to form a system for reducing water damage to drywall.

In terms of use, a method for reducing water damage to drywall 800 includes: (refer to FIGS. 1-27)

(a) providing a system for reducing water damage to the drywall 800, the drywall 800 having a bottom edge 802, the system including:
  a flooring surface 700;
  a track 500 connected to the flooring surface 700, the track 500 having a side wall 502;
  a rod 22;
  a plurality of spaced apart clips 24 connected to rod 22, clips 24 shaped and dimensioned to connect to side wall 502 of track 500 so that rod 22 resides outside track 500 and upon flooring surface 700;
(b) connecting the plurality of clips 24 to side wall 502 of track 500 so that rod 22 resides outside track 500 and rests upon flooring surface 700; and,
  (c) resting bottom edge 802 of the drywall 800 upon rod 22.
The method further including:
  in (a), side wall 502 of track 500 having an inside surface 504;
  in (a), each clip 24 including an arm 26 which is shaped and dimensioned to abut inside surface 504 of side wall 502 of track 500;
  in (a), arm 26 being removably connected to rod 22 so that arm 26 can be selectively disconnected therefrom; and,
  before (b), disconnecting arm 26 from rod 22.
The method further including:
  in (a), each clip 24 including an anchor 28 which is embedded in rod 22; and,
  in (a), anchor 28 including a frangible joint 30;
  the disconnecting of arm 26 from rod 22 effected by rupturing frangible joint 30.

The embodiments of the device and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the device and method should be construed as limiting the invention to a particular embodiment or combination of embodiments. The scope of the invention is defined by the appended claims.

We claim:

1. A system for raising drywall off of a flooring surface, the system cooperating with a track which is connected to the flooring surface, the track having a side wall, the system comprising:
  drywall having a bottom edge;
  a rod;
  a plurality of spaced apart clips connected to said rod, said clips shaped and dimensioned to connect to the side wall of the track; and,
  when said clips are connected to the side wall of the track, said rod resides outside the track and rests upon the flooring surface and said bottom edge of said drywall rests upon said rod.

2. The device according to claim 1, the side wall of the track having an inside surface, the device further including:
  each said clip including an arm which is shaped and dimensioned to abut the inside surface of the side wall of the track; and,
  said arm being removably connected to said rod so that said arm can be disconnected therefrom.

3. The device according to claim 1, further including:
  after installation the drywall permanently resting upon said rod.

4. The device according to claim 1, the drywall having a thickness, the device further including:
  said rod having a width which is approximately equal to the thickness of the drywall, so that when installed said rod is flush with the drywall.

5. A system for reducing water damage to drywall, the system comprising:
  a flooring surface;
  drywall having a bottom edge;
  a track connected to said flooring surface, said track having a side wall;
  a rod;
  a plurality of spaced apart clips connected to said rod, said clips shaped and dimensioned to connect to said side wall of said track; and,
  when said clips are connected to said side wall of said track, said rod resides outside said track and rests upon said flooring surface and said bottom edge of said drywall rests upon said rod.

6. The system according to claim 5, further including:
  said side wall of said track having an inside surface
  each said clip including an arm which is shaped and dimensioned to abut said inside surface of said side wall of said track; and,
  said arm being removably connected to said rod so that said arm can be disconnected therefrom.

7. The system according to claim 5, further including:
  after installation the drywall permanently resting upon said rod.

8. The system according to claim 5, the drywall having a thickness, the system further including:
  said rod having a width which is approximately equal to the thickness of the drywall, so that when installed said rod is flush with the drywall.

9. A method for reducing water damage to drywall, comprising:
  (a) providing a system for reducing water damage to the drywall, the drywall having a bottom edge, the system including:
    a flooring surface;
    a track connected to said flooring surface, said track having a side wall;
    a rod;
    a plurality of spaced apart clips connected to said rod, said clips shaped and dimensioned to connect to said side wall of said track so that said rod resides outside said track and upon said flooring surface;
  (b) connecting said plurality of clips to said side wall of said track so that said rod resides outside said track and rests upon said flooring surface; and,
  (c) resting said bottom edge of the drywall upon said rod.

10. The method of claim 9, further including:
  in (a), said side wall of said track having an inside surface;
  in (a), each said clip including an arm which is shaped and dimensioned to abut said inside surface of said side wall of said track;
  in (a), said arm being removably connected to said rod so that said arm can be disconnected therefrom; and,
  before (b), disconnecting said arm from said rod.

11. A device for raising drywall off of a flooring surface, the device cooperating with a track which is connected to the flooring surface, the track having a side wall which has an inside surface, the device comprising:
  a rod;
  a plurality of spaced apart clips connected to said rod, said clips shaped and dimensioned to connect to the side wall of the track;

each said clip including an arm which is shaped and dimensioned to abut the inside surface of the side wall of the track;

said arm being removably connected to said rod so that said arm can be disconnected therefrom;

each said clip including an anchor which is embedded in said rod; and, said anchor including a frangible joint.

12. A system for reducing water damage to drywall, comprising:

a flooring surface;

a track connected to said flooring surface, said track having a side wall;

a rod;

a plurality of spaced apart clips connected to said rod, said clips shaped and dimensioned to connect to said side wall of said track;

said side wall of said track having an inside surface each said clip including an arm which is shaped and dimensioned to abut said inside surface of said side wall of said track;

said arm being removably connected to said rod so that said arm can be disconnected therefrom;

each said clip including an anchor which is embedded in said rod; and, said anchor including a frangible joint.

13. A method for reducing water damage to drywall, comprising:

(a) providing a system for reducing water damage to the drywall, the drywall having a bottom edge, the system including:

a flooring surface;

a track connected to said flooring surface, said track having a side wall;

a rod;

a plurality of spaced apart clips connected to said rod, said clips shaped and dimensioned to connect to said side wall of said track so that said rod resides outside said track and upon said flooring surface;

(b) connecting said plurality of clips to said side wall of said track so that said rod resides outside said track and rests upon said flooring surface;

(c) resting said bottom edge of the drywall upon said rod;

in (a), said side wall of said track having an inside surface;

in (a), each said clip including an arm which is shaped and dimensioned to abut said inside surface of said side wall of said track;

in (a), said arm being removably connected to said rod so that said arm can be disconnected therefrom;

before (b), disconnecting said arm from said rod;

in (a), each said clip including an anchor which is embedded in said rod;

in (a), said anchor including a frangible joint; and, said disconnecting of said arm from said rod effected by rupturing said frangible joint.

\* \* \* \* \*

UNITED STATES PATENT AND TRADEMARK OFFICE
CERTIFICATE OF CORRECTION

PATENT NO. : 8,955,277 B1
APPLICATION NO. : 14/089847
DATED : February 17, 2015
INVENTOR(S) : David Allen Joye and David James Atkins Page 1 of 1

It is certified that error appears in the above-identified patent and that said Letters Patent is hereby corrected as shown below:

In the claims,

Col. 5, lines 56 & 57,
In line one of Claim 2, change "device" to --system--.
In line two of Claim 2, change "device" to --system--.
Col. 5, lines 63 & 64,
In line one of Claim 3, change "device" to --system--.
In line two of Claim 3, change "the" to --said--.
Col. 5, lines 66 & 67,
In line one of Claim 4, change "device" to --system--.
In line one of Claim 4, change "the" to --said--.
In line two of Claim 4, change "device" to --system--.
Col. 6, lines 2 & 3,
In line four of Claim 4, change "the" to --said--.
In line five of Claim 4, change "the" to --said--.
Col. 6, line 27,
In line two of Claim 7, change "the" to --said--.
Col. 6, lines 29, 32 & 33,
In line one of Claim 8, change "the" to --said--.
In line four of Claim 8, change "the" to --said--.
In line five of Claim 8, change "the" to --said--.

Signed and Sealed this
Fifth Day of May, 2015

Michelle K. Lee
*Director of the United States Patent and Trademark Office*